United States Patent [19]

Kimball et al.

[11] Patent Number: 4,589,943

[45] Date of Patent: May 20, 1986

[54] APPARATUS AND PROCEDURE FOR APPLYING ADHESIVE LABELS

[75] Inventors: John J. Kimball, Huntington Station, N.Y.; Harry V. Kirk, Kennesaw, Ga.; Richard L. Roule, Westport, Conn.; Richard C. Sennett, Annandale, Va.; Peter J. Sorbo, Stamford, Conn.

[73] Assignees: American Bank Note Company, New York, N.Y.; Kirk-Rudy, Inc., Kennesaw, Ga.

[21] Appl. No.: 587,375

[22] Filed: Mar. 8, 1984

[51] Int. Cl.⁴ ........................ B26D 5/38; B32B 35/00; B65C 9/42

[52] U.S. Cl. .................................... 156/256; 156/259; 156/267; 156/353; 156/354; 156/355; 156/359; 156/362; 156/517; 156/521; 156/556; 156/566; 156/568

[58] Field of Search ............... 156/256, 259, 267, 517, 156/521, 538, 556, 559, 560, 561, 568, 566, 567, DIG. 1, DIG. 33, 353, 354, 355, 362

[56] References Cited

U.S. PATENT DOCUMENTS

| | | | |
|---|---|---|---|
| 2,516,783 | 7/1950 | Matter | 156/521 |
| 2,543,220 | 2/1951 | Ardell | 156/521 |
| 3,159,521 | 12/1964 | Pechmann | 156/DIG. 33 |
| 3,556,909 | 1/1971 | Stegman | 156/566 |
| 3,647,602 | 3/1972 | McGuire et al. | 156/528 |
| 3,915,785 | 10/1975 | Müller | 156/566 |
| 4,354,894 | 10/1982 | Lewis et al. | 156/517 |
| 4,462,851 | 7/1984 | Colgate | 156/212 |

*Primary Examiner*—Caleb Weston

*Attorney, Agent, or Firm*—Cooper, Dunham, Clark, Griffin & Moran

[57] ABSTRACT

A machine for applying tax stamps or like adhesive labels to articles such as cigarette packages arranged in two or more rows in a carton, including mechanism for advancing the carton lengthwise with exposed ends of the packages facing upwardly, and a head disposed above the path of carton advance for transporting a corresponding number of rows of spaced-apart labels into contact with the advancing package ends while the labels and packages are moving in the same direction and at the same velocity. The head, which is movable vertically to accommodate packages of different heights, carries a supply of the labels in the form of an adhesive-backed web bearing spaced longitudinal rows of label imprints; a device for advancing the web lengthwise; a slicer for removing from the advancing web a longitudinal strip portion between the rows of imprints; a knife for cutting the separated rows of imprints into individual labels; and vacuum means for receiving the cut labels and transporting them, lengthwise of the rows, into contact with the package ends. The vacuum means may include a drum, having a preforate periphery on which the spaced rows of labels are held by suction, mounted for rotation in a plane containing the path of carton advance and positioned for tangential contact with the exposed package ends. Each time a carton is advanced, the web is intermittently advanced and the requisite number of labels for one carton are cut and transferred to the drum periphery, which applies them to the ends of the packages in the carton.

32 Claims, 15 Drawing Figures

Fig. 3.
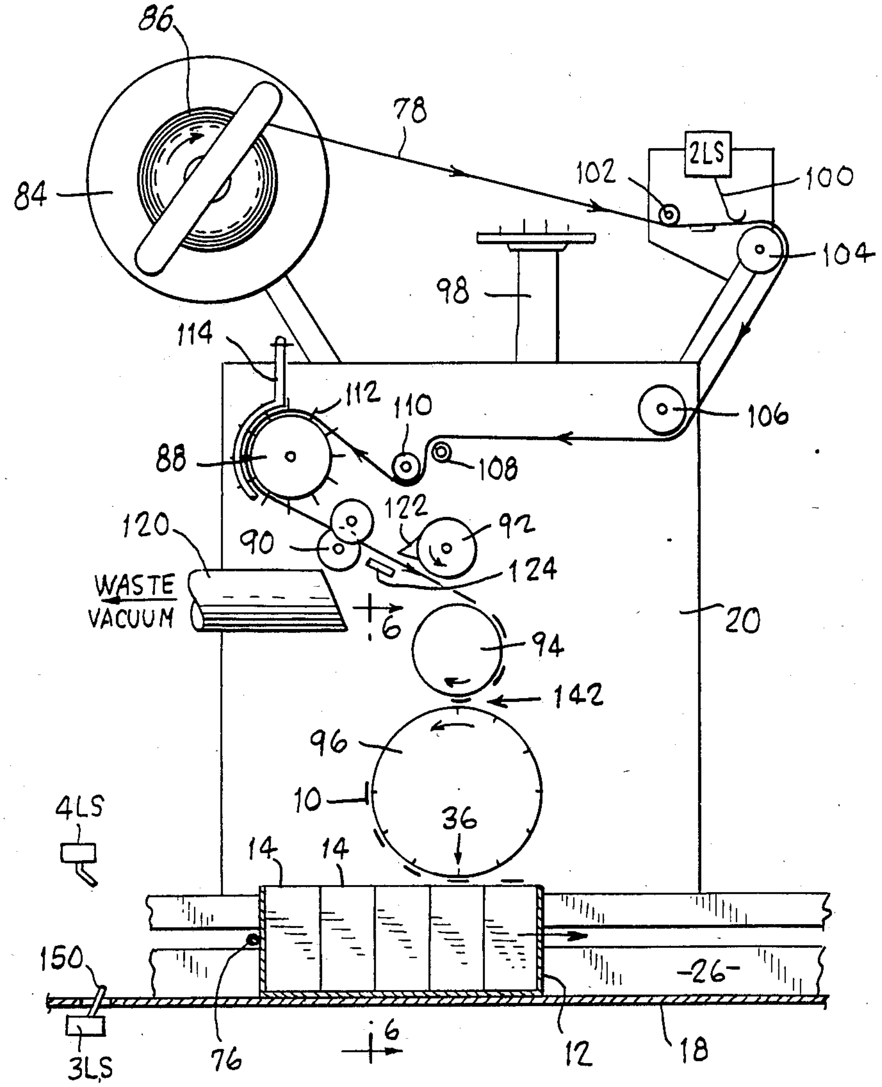
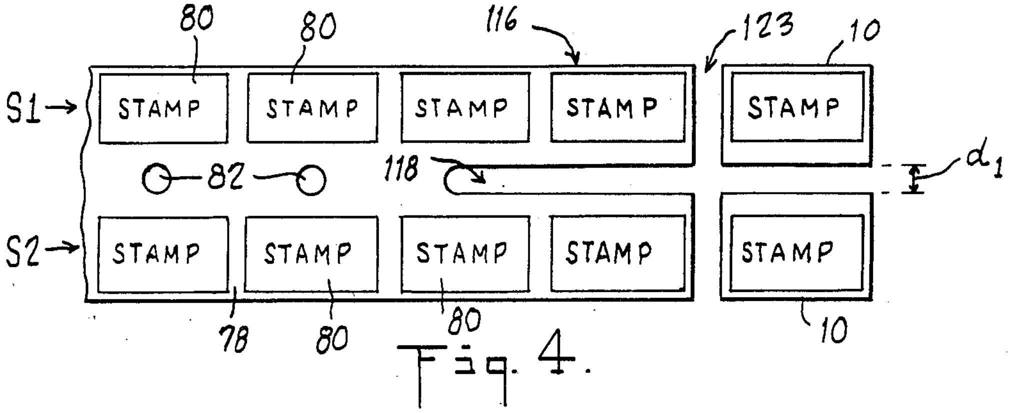
Fig. 4.

WEB
2LS
88
WEB FEED PINWHEEL
SLICER
90
CUTTER
92
TRANSFER DRUM
94
APPLICATOR DRUM
THS
HEAT
96
28
MIS-ALIGNMENT
1LS
30
SECOND PUSHER
FLAP
4LS
FIRST PUSHER
3LS
CARTON
154
SOLENOID OPERATED CLUTCH
156
MAIN MOTOR CONTROL
MAIN MOTOR
152
3LS
START/STOP
1LS
2LS
4LS
THS
158
CONTROL
DRIVE

-26-
-12-
50
48
14
11
40
16b
16a
22
24
46
44
42
10
42c
42b
42a

Fig. 14.
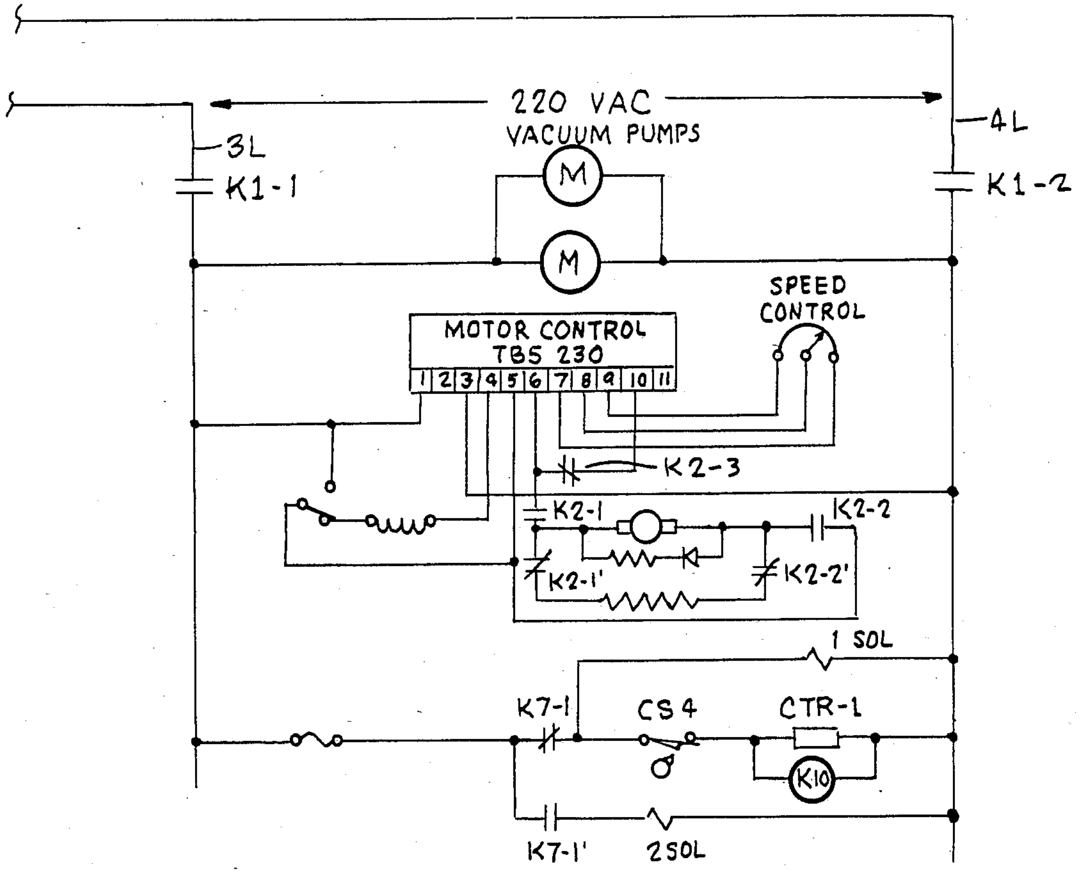
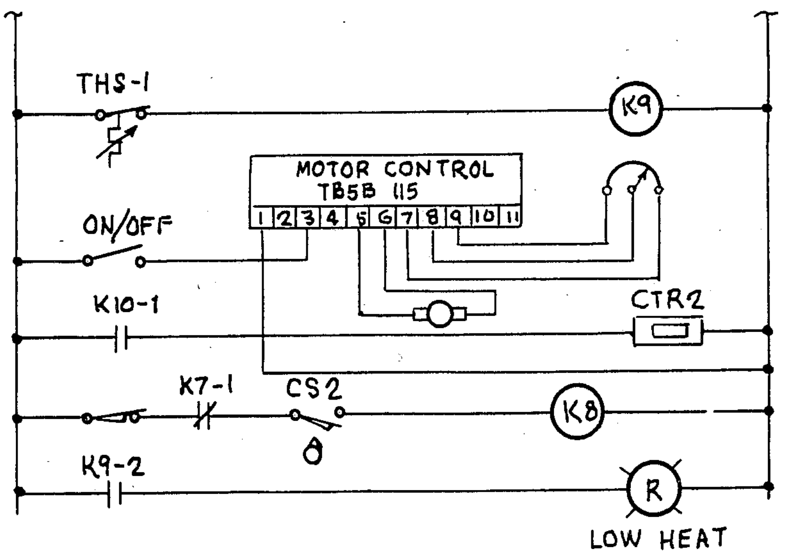
Fig. 15.

APPARATUS AND PROCEDURE FOR APPLYING ADHESIVE LABELS

BACKGROUND OF THE INVENTION

This invention relates to apparatus and procedure for applying adhesive labels to articles arranged in rows. In an important specific aspect, to which detailed reference will be made herein for purposes of illustration, the invention is particularly concerned with the application of tax stamps to cigarette packages contained in cartons.

Many U.S. states require that state tax stamps be applied to all cigarette packages sold within their borders. In present-day commercial practice, cigarette packages as supplied by manufacturers to distributors lack tax stamps and are enclosed in cartons each typically holding ten packages arranged in two parallel rows. The distributors must accordingly open every carton and apply tax stamps to all the contained packages.

Various types of more or less automated equipment have heretofore been proposed and used for performing this operation. Commonly, in such apparatus, successive cartons are fed lengthwise past a plow which opens their side flaps to expose the ends of the cigarette packages, then advanced to a station at which tax stamps are applied to the exposed package ends, and finally transported past devices for gluing and reclosing the carton flaps. The stamps may be inked impressions directly imprinted on the package ends, or transfer labels (decalcomanias), e.g. supplied in sheets. Use of paper labels affords potential benefits, however, especially from the standpoint of security, because paper labels can bear a complex intaglio imprint which is difficult to counterfeit.

Heretofore, the application of tax stamps in the form of labels to cigarette packages (i.e. using known types of equipment) has been attended with various disadvantages. In particular, it has generally been necessary to bring each carton to a full halt while the labels are applied, with the result that the rate of production (number of cartons stamped per unit time) has been undesirably slow and inefficient. The labelhandling portions of the equipment have often been inconveniently complex in structure and operation. It has frequently been difficult or impossible to adjust the apparatus for use with cigarette packages of different heights. In addition, the known machines have sometimes been susceptible to jamming or other malfunctions causing misapplication or nonapplication of stamps or damage to the cigarette cartons.

SUMMARY OF THE INVENTION

The present invention, in one aspect, embraces apparatus for applying adhesive labels to upwardly facing surfaces of each of a multiplicity of articles arranged contiguously, with their upwardly facing surfaces substantially coplanar, in a plurality of parallel rows each including a plurality of the articles. In this aspect, the invention broadly contemplates the provision, in combination, of means for defining a rectilinear path for concurrent lengthwise advance of the rows of articles past a predetermined locality; means for providing, at a second locality spaced from the defined path, a multiplicity of separate adhesive labels arranged, in the same number of rows as the articles, for register respectively with the upwardly facing surfaces of articles advancing in the aforementioned defined path; and means for transporting the labels (lengthwise of the rows of labels) from the second locality into contact with the upwardly facing surfaces of the advancing articles at the aforementioned predetermined locality, in such manner that the labels and the articles are moving in the same direction and at the same speed as they come into contact, while maintaining the above-described arrangement of the labels during such transport. It will be understood that the term "multiplicity" herein means at least four; that the term "plurality" means at least two; and that references to directions such as "upwardly" are employed in a relative rather than an absolute sense, i.e. to indicate relative orientations or positions of localities or apparatus elements.

As a particular feature of the invention, the label-providing means is designed for use with labels supplied as an elongated web of flexible sheet material having one surface bearing an adhesive material and an opposite surface bearing a plurality of spaced-apart rows of label imprints extending longitudinally of the web, wherein the spacing between adjacent rows of imprints is equal to a predetermined desired spacing between applied labels on adjacent rows of articles advancing past the aforementioned predetermined locality, and the number of rows of imprints is equal to the number of such rows of articles. This label-delivering means includes means for advancing the web lengthwise along a path leading toward the second locality; means, positioned in the last-mentioned path, for slicing out and removing from the advancing web a longitudinal strip portion between each two adjacent rows of imprints; and means, positioned in the last-mentioned path beyond the slicing means, for cutting the advancing web transversely to separate the rows of imprints into individual labels, and for delivering the individual labels to the second locality in the above-described arrangement. The term "label imprint" refers to an imprinted portion of the web which, after separation from the web by the slicing and cutting means, becomes a single label, to be applied to one article; in situations where two or more label imprints as thus defined are initially undifferentiated portions of a continuous imprint (e.g. extending, transversely of the web, across a web portion which is to be sliced out), it will be understood that reference herein to spaced-apart rows of label imprints designates the disposition and arrangement on the web of those undifferentiated portions which ultimately become separate single labels.

Further in accordance with the invention, the label-transporting means (which constitute the means for applying the labels to the articles) may comprise a cyclically movable endless surface disposed and dimensioned for simultaneous tangential engagement with the upwardly facing surfaces of adjacent articles in all the rows of articles at the aforementioned predetermined locality as the rows of articles advance together in the defined rectilinear path, the endless surface being mounted above that path for movement in the same direction as the rows of articles at the aforementioned predetermined locality; and means for releasably holding individual labels on the endless surface at plural spaced rows of plural spaced sites positioned for register with the upwardly facing surfaces of the articles as the endless surface moves and the rows of articles advance in the defined path. Drive means are provided for unidirectionally advancing the rows of articles in the defined path, and moving the endless surface, at the same speed.

Thus, the transporting means may include a drum, mounted above the defined path of article advance for rotation in a plane containing that path (i.e. in the vertical plane that contains the horizontal rectilinear center line of the defined path of article advance), and having a cylindrical periphery (constituting the endless surface) having suction openings at the aforementioned spaced sites, together with means for applying suction through the openings to hold the labels against the drum periphery at those sites.

The label cutting and delivering means mentioned above may include a web-cutting element positioned at a third locality spaced from the second locality, and a second drum having a periphery formed with spaced rows of spaced suction openings for picking up the cut labels at the third locality and transporting them into contact with the periphery of the first-mentioned drum at the second locality for transfer thereto, means being provided for applying suction through the second-drum openings to hold the labels on the periphery of the second drum during such transport. The second drum is arranged for rotation in the same plane as the first drum; advantageously this plane also contains the center line of the path of advance of the web to the slicing means and the web-cutting elements. The orientation of the web in the last-mentioned path, and the arrangement of the first and second drums, are such that the labels are transported on the first drum with their adhesive-bearing surfaces facing outwardly, i.e. in position for contact with and adhesion to the upwardly facing surfaces of the advancing articles at the predetermined locality of label application in the defined path of article advance. Conveniently, the adhesive employed for the labels is heat-activated, and means are provided for supplying heat to activate the adhesive only as the labels are being carried on the first drum, so that the web and labels do not tend to stick to the second drum or to the web-handling elements at and ahead of the web-cutting element.

As will be appreciated from the foregoing description, the apparatus of the invention applies labels to the rows of articles while the articles are advancing past the predetermined locality at a constant speed, owing to the fact that when the labels arrive at that locality they are moving in the same direction and at the same speed as the articles and are already arranged in properly spaced positions for register with the upwardly facing surfaces of the articles; hence the rate of production is advantageously rapid as compared with known label-applying systems that require the articles to be stationary while labels are applied. The initial provision of the labels as spaced rows of imprints on an elongated web establishes the transverse spacing of the labels, and this transverse spacing is maintained throughout the web- and label-handling portions of the apparatus by virtue of the alignment of the paths of web and article advance with the common plane of rotation of the first and second drums, so that there is no need to displace the labels transversely (as and after they are separated) in order to position them properly for application. The spacing between successive suction openings in each row of openings on the drums corresponds to the requisite spacing between the label-receiving surfaces of successive articles in each row of advancing articles; the rate of web advance and cutting element operation are synchronized with the rate of rotation of the drums so that successive cut labels are picked up by successive suction openings of the second-drum periphery, thereby to provide proper longitudinal spacing between labels.

In a specific sense, the invention is embodied in apparatus (including the above-described features) for applying labels to coplanar upwardly facing end surfaces of identically shaped, dimensioned and oriented articles arranged in groups each consisting of the same predetermined plurality of contiguous rows each containing the same predetermined plurality of contiguous articles aligned with the articles in each adjacent row, such groups being exemplified by conventional cigarette cartons each containing ten cigarette packages arranged in two rows of five packages each. The groups of articles are advanced in succession, lengthwise of the rows, along the aforementioned defined path. Means are provided for intermittently actuating the web-advancing means and the web-cutting means, in response to the advance of each group of articles along the defined path toward the predetermined locality, to deliver to the second drum a plurality of separated labels equal in number to the articles of a group. The apparatus may also include means, disposed in the defined path of article advance ahead of the predetermined locality, for opening the flaps of cigarette cartons to expose the package ends for application of labels, and means for reclosing the carton flaps beyond the predetermined locality. In addition, the apparatus may include means for interrupting operation in response to the sensed occurrence of any of the following conditions: jamming of a carton, presence of a carton flap occluding the package ends beyond the flap-opening means, absence of a label web in the path of web advance, or failure of the heating means to maintain an adequately high temperature for activation of the label adhesive.

The label-providing and label-transporting means may be carried on a head disposed above the aforementioned predetermined locality, and means may be provided for adjusting the vertical position of the head relative to the path of article advance, thereby to accommodate articles (e.g. cigarette packages) of different heights. The carton-flap-opening and closing means may also be carried on this head, for vertical movement therewith.

The web used in the label-applyiing system may be provided with regularly spaced holes along its length, for use with web-advancing means comprising a wheel rotatably mounted in the path of web advance and bearing a plurality of radial pins regularly spaced around its periphery for insertion in the web holes. The holes are positioned between adjacent rows of label imprints, in alignment with the web portions to be sliced out between these rows, and correspond in diameter to the width of the portion to be sliced out so as to separate the sliced-out portion into short lengths for ease of removal; vacuum means may be disposed adjacent the slicing means for withdrawing these short lengths from the apparatus as they are sliced.

In another aspect, the invention contemplates the provision of procedure for applying labels to articles, such procedure being exemplified by the operation of the apparatus described above.

Further features and advantages of the invention will be apparent from the detailed description hereinafter set forth, together with the accompanying drawings.

BRIEF DESCRIPTION OF THE DRAWINGS

FIG. 3 is an enlarged, fragmentary side elevational view of the web-handling and label-applying elements of the apparatus;

FIG. 4 is a further enlarged plan view of a portion of a label web for use with the invention;

FIGS. 13, 14, and 15 are diagrams of the control circuits of the apparatus of FIG. 1.

DETAILED DESCRIPTION

Figure 7:
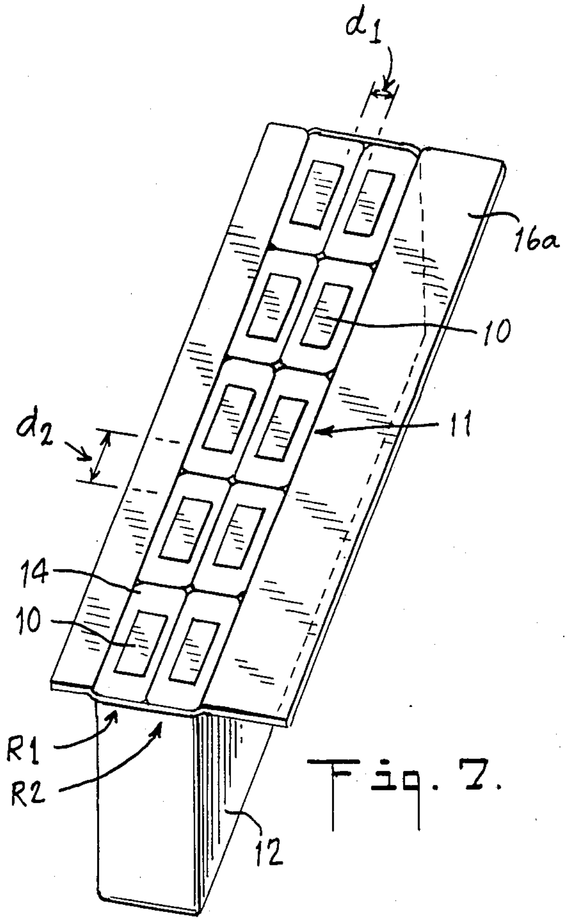
FIG. 7 is a perspective view of a conventional cigarette carton, with flaps open, containing cigarette packages bearing labels applied by the apparatus of FIG. 1.

Referring to the drawings, the invention will be described as embodied in apparatus and procedure for applying tax stamps in the form of printed adhesive labels 10 to cigarette packages 11 contained in cartons 12. All the packages 11 within a given carton are identical in shape and dimensions, each being a rectangular solid with two opposed broad sides, two opposed narrow sides, and two opposed ends. As best seen in FIG. 7, each carton 12 holds ten such packages 11, arranged in two parallel contiguous rows R1 and R2 (of five packages each), extending lengthwise of the carton. The narrow sides of the packages in each row are contiguous with the narrow sides of the adjacent package or packages in the same row, and the broad sides of the packages lie in planes parallel to the direction in which the rows extend, while the surfaces 14 of the upwardly facing ends of all the packages in both rows lie in a common plane, and the packages in row R1 are respectively in register with those in row R2, so that the ten packages occupy a rectangular solid volume snugly surrounded laterally and below by the carton 12, which holds the packages in the described arrangement. Two longitudinal flaps 16*a* and 16*b*, respectively extending along the opposed long top edges of the carton, can be folded overlappingly to cover the package end surfaces 14 and thereby to complete the enclosure of the packages. In a carton of cigarettes as supplied by a manufacturer, the flaps 16*a* and 16*b* are initially closed and lightly glued together; they must be opened, as shown in FIG. 7, to expose the package end surfaces 14 for application of tax stamps 10 thereto. Throughout the following description, and in the drawings, the cartons 12 are considered as oriented with the package end surfaces 14 facing upwardly (and lying in a horizontal plane) and with the rows R1 and R2 extending in a horizontal direction.

Each of the stamps or labels 10 is a rectangular piece of paper bearing an imprint on its upwardly facing surface as seen in FIG. 7 and a layer of adhesive material on its downwardly facing surface as seen in FIG. 7 for affixing the stamp to the end surface 14 of a cigarette package. Typically the imprint contains the name of the taxing authority and/or other identifying indicia; for security purposes, i.e. to deter counterfeiting, the imprint may comprise or include a complex intaglio-printed design. Since state laws require that each individual package 11 carry a tax stamp, it is important that the stamps not overlap the edges of the package end surfaces 14, because such overlap might cause one stamp to adhere to two packages. Consequently, the stamps are smaller, both in length and in width, than the package end surfaces 14, and while they need not be precisely centered on the surfaces 14, all the edges of each stamp should be spaced inwardly of the edges of the end surface 14 to which it is affixed. Again as illustrated in FIG. 7, therefore, the ten stamps 10 respectively applied to the ten packages 11 in a carton 12 are arranged in two parallel rows which are spaced apart laterally by a distance $d_1$ with the successive stamps in each row spaced apart longitudinally by distances $d_2$.

Figure 1:
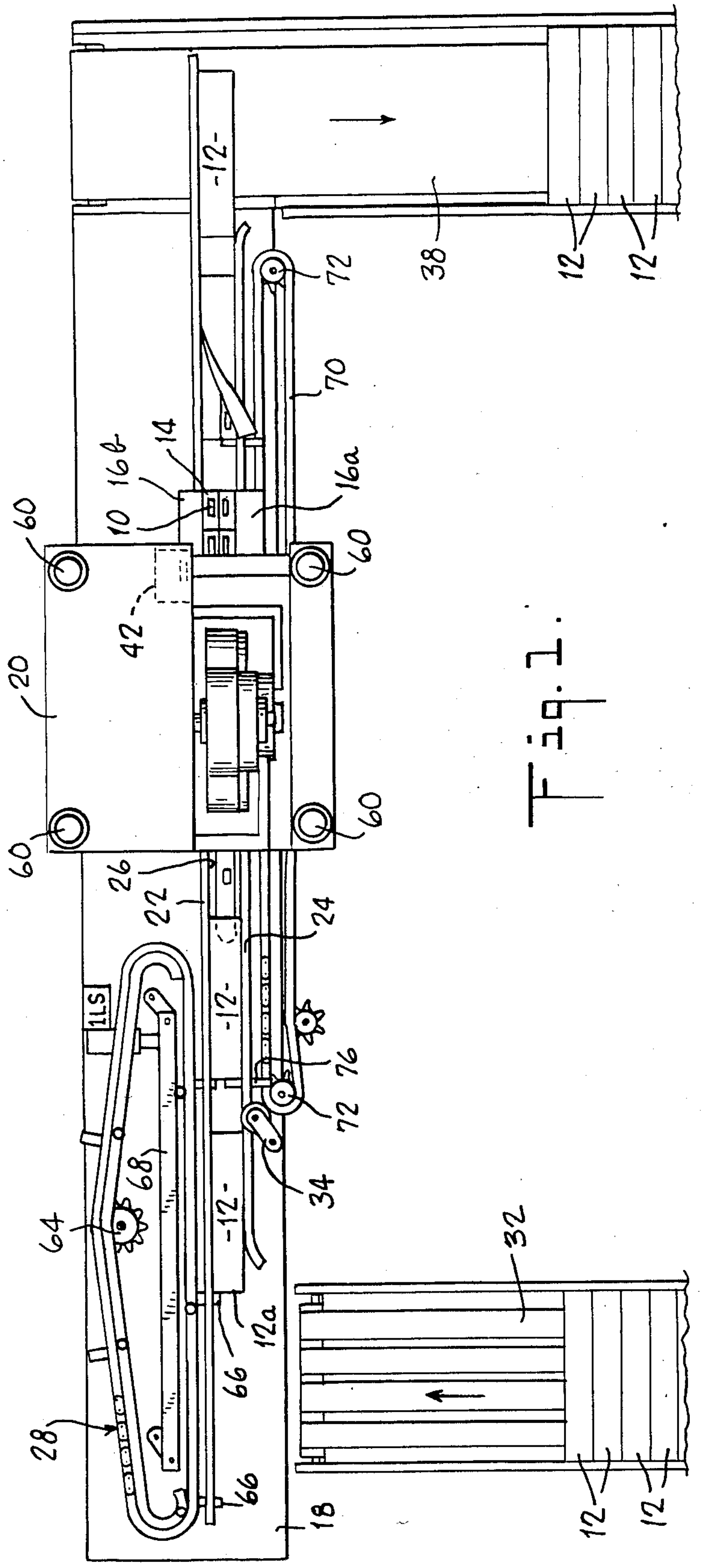
FIG. 1 is a simplified plan view of apparatus embodying the present invention in a particular form.
Figure 2:
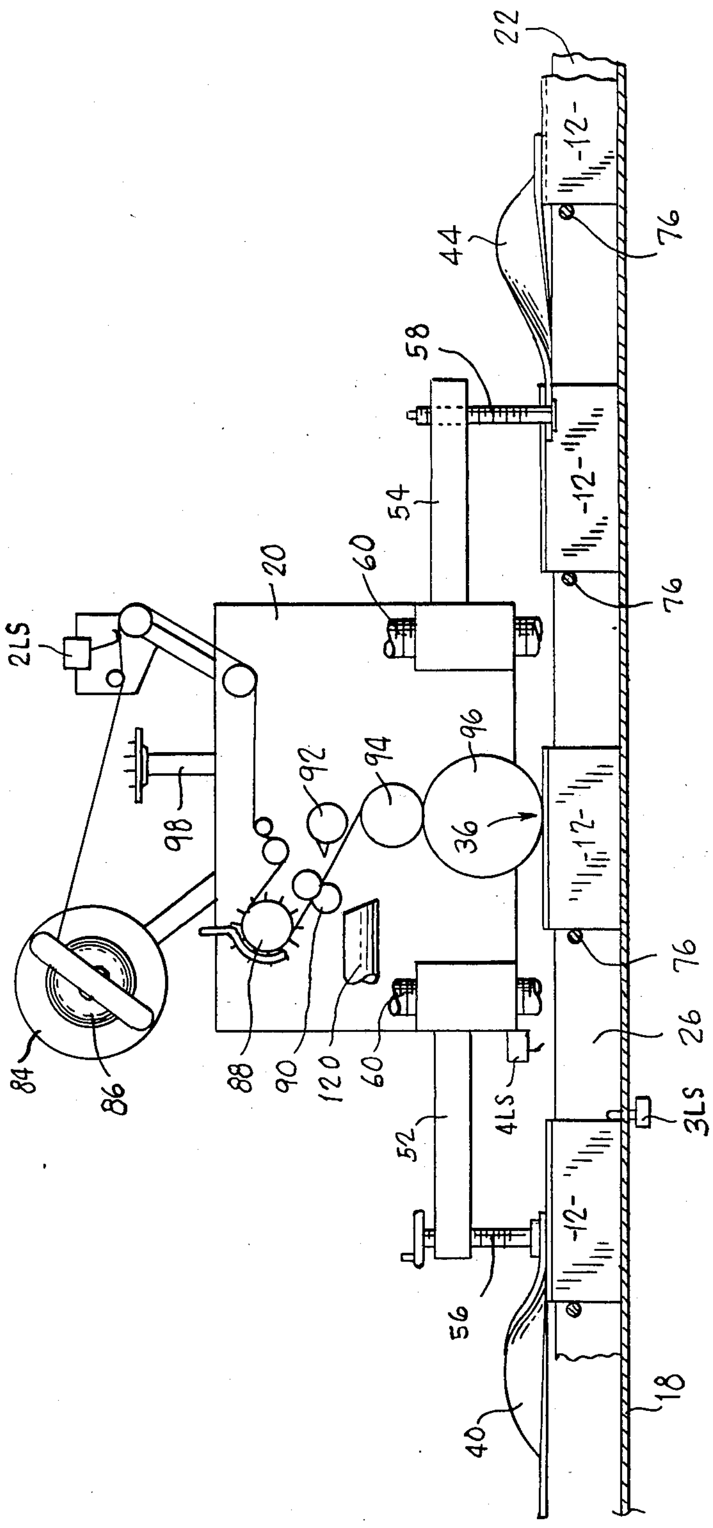
FIG. 2 is a side elevational view of the apparatus of FIG. 1.

Referring now more particularly to FIGS. 1 and 2, the illustrated embodiment of the apparatus of the invention includes a horizontal table 18 and a head 20 disposed above and movable vertically relative to the table 18, which extends for some distance to the left and to the right of the head. A rectilinear horizontal path for successive lengthwise advance of cartons 12 beneath the head, from left to right as seen in FIGS. 1 and 2, is defined by parallel guide walls 22 and 24 mounted on the table 18 to form a laterally confined, upwardly open and open-ended carton trough 26 having a width just sufficient to accommodate the width of one carton 12 oriented as described above. First and second synchronously driven pusher devices, respectively designated 28 and 30 (and further described below), are disposed adjacent successive portions of the carton path defined by walls 22, 24, for successively engaging the trailing end of a carton in that path to advance the carton along the path (i.e. along trough 26) at a constant speed from the left-hand end to the right-hand end of the table 18.

A motor-driven horizontal infeed conveyor 32 (FIG. 1) delivers successive cartons 12 of nonstamped cigarette packages (with flaps 16*a* and 16*b* closed) sidewise to the inlet (left-hand) end of the trough 26. As each carton comes into alignment with the trough, its left-hand or trailing end 12*a* is engaged by the first pusher 28, which moves the carton lengthwise into and along the trough, while an axially vertical roller 34 mounted on the table 18 bears against a side surface of the advancing carton to assist in positioning it and opens the top of the carton for plow entry. The trailing end of the carton is next engaged by the second pusher 30, for continuing the uninterrupted advance of the carton to and beneath the head 20, past a predetermined locality or station 36 (FIG. 2) at which the tax stamps are applied to the carton, and on to the outlet (right-hand) end of the trough 26, where the carton is deposited on and removed sidewise by a motordriven horizontal outlet conveyor 38.

Figures 10, 11, 12:
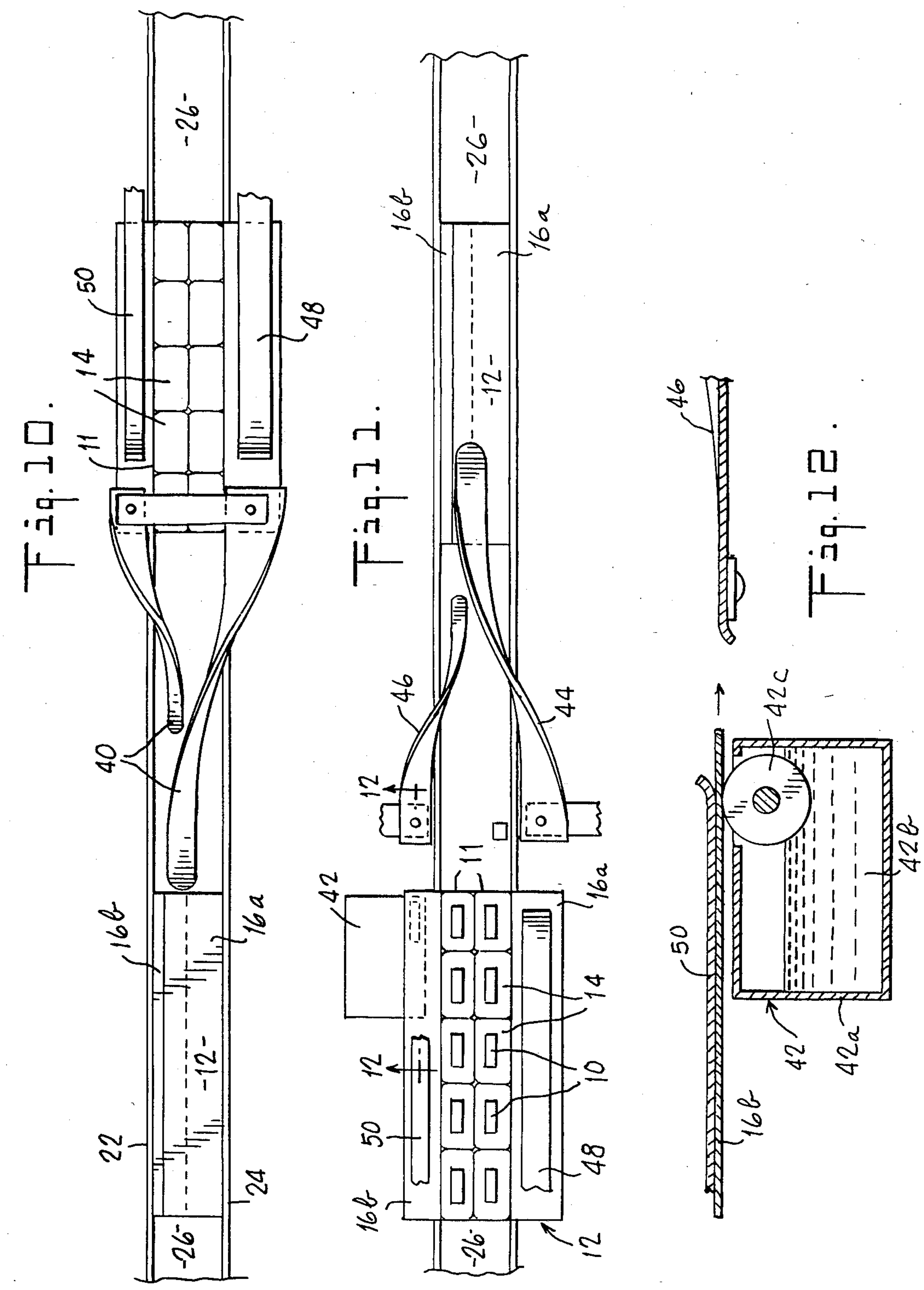
FIG. 10 is a similar view of the carton-flap-opening element of the same apparatus.
FIG. 11 is a similar view of the flap-reclosing elements of the same apparatus.
FIG. 12 is a fragmentary view taken as along the line 12—12 of FIG. 11.

A stationary plow 40 (FIGS. 2 and 10), carried by and projecting leftwardly from the head 20 above the trough 26, is positioned to be inserted just beneath the leading edges of the flaps 16a and 16b of a carton advancing along the trough, and is so shaped that the continuing advance of the carton forces the flaps upwardly and outwardly around the plow, thus opening the upwardly-facing side of the carton ahead of the locality or station 36 to expose the upwardly facing package end surfaces 14 for application of the stamps at the station 36. Beyond (to the right of) station 36, a gluing device 42 (FIGS. 1, 11 and 12) applies glue to the outer surface of the flap 16b, and a pair of stationary arms 44, 46 (FIGS. 2, 11 and 12) also carried by the head 20 engage the flaps 16a and 16b of the advancing carton to urge them back into closed position, with flap 16a overlapping flap 16b and adhered thereto by the applied glue, thereby to reclose the carton after application of the stamps and before delivery of the carton to the outlet conveyor. The gluing device may be a pot 42a filled with liquid glue 42b with a roller 42c partially immersed therein and engaging the flap 16b to carry the glue to the flap surface. A pair of flat horizontal bars 48 and 50, carried by the head and respectively extending along opposite sides of the trough 26 (but above the trough) adjacent the stamp-applying station 36, hold the flaps 16a and 16b in open position as the carton traverses the station 36 (FIGS. 6, 10, 11 and 12); the ends of these bars are curved upwardly for smooth passage of the flaps beneath and beyond them. Advantageously, the plow 40 and the arms 44 are suspended from projecting support portions 52 and 54 of the head 20 by means of threaded rods 56 and 58, respectively (FIG. 2), to enable fine adjustment of their elevation for exact positioning relative to the particular cartons being processed.

As stated, the head 20 is itself vertically movable relative to the table 18, being supported for this purpose by means shown as a plurality of axially vertical threaded rods 60 which can be rotated together, e.g. by a motor (not shown in FIG. 2) under control of a manual switch (also not shown) to raise or lower the head. The purpose of such adjustment of head elevation is to accommodate cigarette cartons of different heights, viz. to enable use of the same apparatus to apply stamps to packages of "regular size," "king size," "100's" or "120's" cigarettes or to packages of cigarettes of other heights, the stamp-applying elements of the apparatus being carried by and moved vertically with the head.

Figure 9:
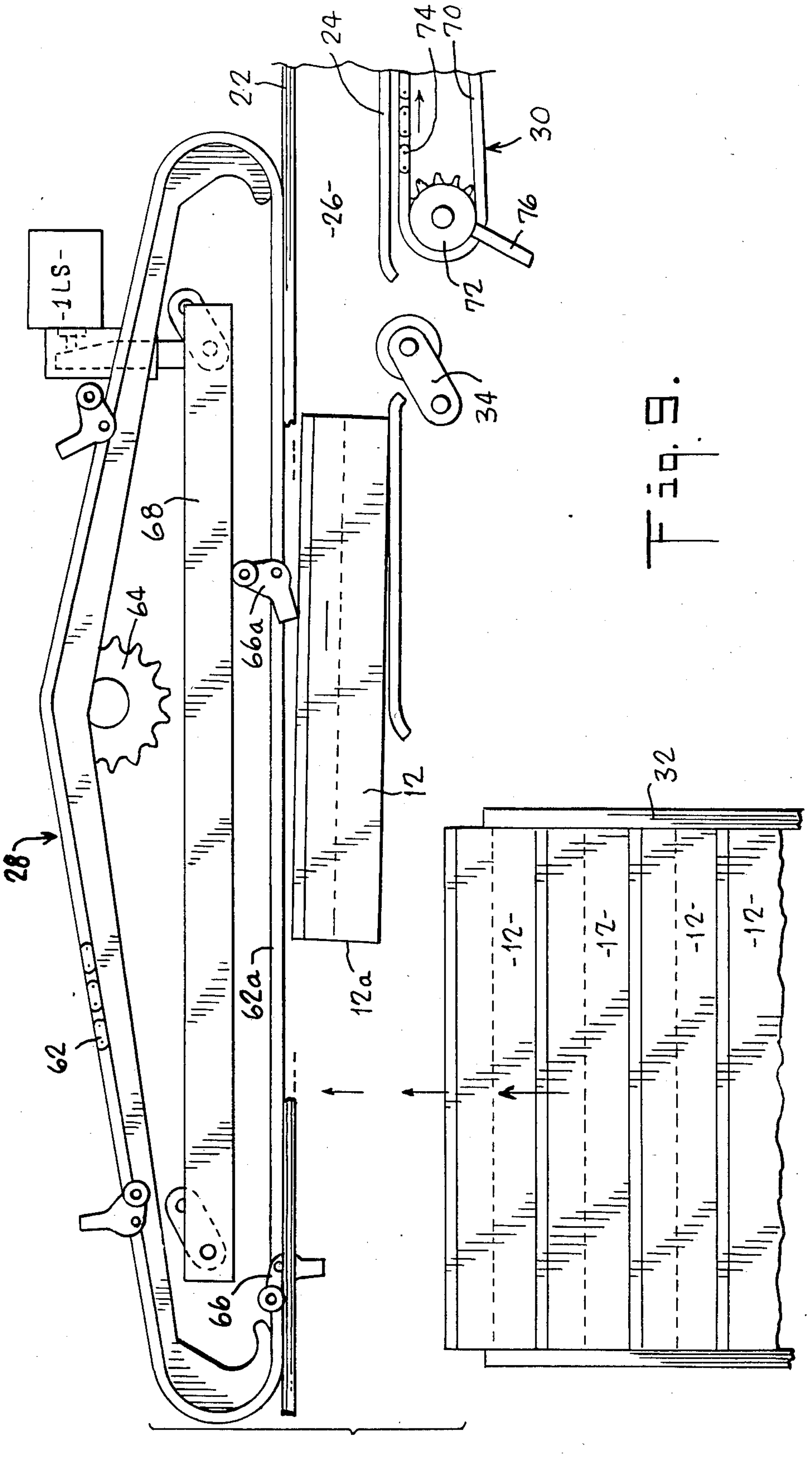
FIG. 9 is an enlarged fragmentary plan view of the carton-advancing elements of the apparatus of FIG. 1.

The first pusher 28, as best seen in FIGS. 1 and 9, comprises an endless chain 62 mounted on sprockets 64 (one of which is driven) for cyclical motion in a horizontal path including a run 62a extending parallel to a first, left-hand portion of the horizontal rectilinear path of lengthwise advance of the cartons 12 on the table 18, includinq the inlet portion of trough 26. A plurality of lugs 66, pivotally mounted on the chain 62 at localities spaced horizontally by a distance greater than the length of one carton 12, project into the path of carton advance for engagement, respectively, with the trailing ends 12a of successive cartons delivered to the table 18 by the infeed conveyor 32. In the aforementioned run 62a, the direction of advance of the chain and lugs is from left to right in FIGS. 1 and 9, so that a lug 66 engaging a carton end 12a pushes the carton into and along the trough 26 toward the head 20.

In the event that a lug 66 is misaligned with a delivered carton so as to engage a side of the carton rather than the trailing end thereof, as shown in FIG. 9 at 66a, the misaligned lug pivots away from its normal position, engaging a movable bar 68 mounted adjacent the chain run 62a and displacing bar 68 rearwardly. This displacement of bar 68 actuates a switch 1LS which interrupts the main motor drive of the apparatus, as hereinafter further explained, immediately halting pusher 28 (as well as pusher 30 and other apparatus elements) and thereby preventing damage to the carton by the misaligned lug. Removal and realignment of the carton (with the next advancing lug 66) releases bar 68 for return to its normal position; switch 1LS is then no longer actuated, and operation can resume.

The second pusher 30, like pusher 28, includes a chain 70 mounted on sprockets 72 for horizontal cylical movement including a run 74 that extends rightwardly from pusher 28 along the remainder of trough 26, past and beyond the head 20. The chain 70 likewise bears a plurality of lugs 76, positioned to project into the trough 26 and spaced along the chain for respectively engaging the trailing ends of successive cartons 12 in the trough, the chain being driven (through one of its sprockets) so that in run 74 it and its lugs advance from left to right as seen in FIG. 1. The two pushers are so disposed that a lug 76 of the second pusher engages a carton trailing end while a lug 66 of the first pusher is still in engagement with that carton end, so that (with the pushers synchronously driven, as stated, at the same speed) each carton is advanced lengthwise from left to right, by the two pushers in succession, along the full length of the trough 26 without interruption and at a constant linear velocity.

The stamps or labels 10 are supplied in the form of a unitary elongated strip or web 78 of paper (FIG. 4) having one surface bearing an adhesive material and an opposite surface (viz. the surface shown in FIG. 4) bearing a multiplicity of stamp or label imprints 80 arranged in two rows S1 and S2 (i.e. for application to the two rows of cigarette packages in a carton 12). As illustrated in FIG. 4, the imprints in each row are spaced apart longitudinally and are aligned with the corresponding imprints in the other row; the two rows of imprints S1 and S2 extend lengthwise of the web 78 and are spaced apart laterally (transversely of the web) by a distance equal to the desired spacing $d_1$ (FIG. 7) between applied stamps on the two rows of cigarette packages in a carton 12. The web 78 also has an array of holes 82 disposed at regular intervals along its length between the two rows S1 and S2 of imprints 80. Advantageously, the web is provided in a form embodying the invention described and claimed in the copending U.S. Patent Application of Richard L. Roule, Peter J. Sorbo, and John J. Kimball (three of the aplicants herein), Ser. No. 06/587,374 (now U.S. Pat. No. 4,533,586), filed concurrently herewith, for "Web of Adhesive Labels"; in this web, the holes 82 are disposed in register with successive imprints in those rows. In the embodiments of the present invention herein described, the adhesive used for the web 78 is a heat-activated adhesive.

The elements of the apparatus for applying the stamps to the cigarette packages are carried by the head 20 and are best seen in FIGS. 2, 3, 6 and 8. These elements include a spindle 84 rotatably supporting a coil 86 of the web 78; a web feed pinwheel 88 for advancing the web longitudinally from the coil; a slicer 90 for cutting, from the advancing web, a central longitudinal strip portion; a cutter 92 for cutting the web transversely into individual stamps or labels; a vacuum transfer drum 94 for transporting the cut labels or stamps from the locality of the cutter; and a vacuum applicator drum 96 for receiving the stamps from the transfer drum and delivering them to the end surfaces 14 of the cigarette packages in a carton 12 advancing past the station 36. Intermediate the spindle 84 and the pinwheel 88, the web 78 advances past a splicing table 98, a switch 2LS having a sensor 100 for detecting the presence or absence of a web in the path of web advance, and a succession of guide rolls 102, 104, 106, 108, 110 which aid in defining the web path of advance and maintain appropriate tension on the web as it advances.

The coil 86, the aforementioned guide rolls, the pinwheel 88, and the vacuum drums 94 and 96 are all mounted on the head for rotation (about horizontal axes) in a common vertical plane which contains the horizontal center line of the path of rectilinear advance of the cartons 12 in the trough 26 past the station 36. This plane longitudinally bisects the advancing web 78 throughout its path of advance and of course lies between the two rows R1 and R2 of cigarette packages in an advancing carton at station 36. The pinwheel 88 bears a plurality of radial pins 112 regularly spaced around its periphery for insertion in the holes 82 of the web 78, and these pins are disposed in the last-mentioned plane of rotation. Thus, as will be further apparent from the following description, the two rows of imprints S1 and S2 in the coil of web 86 mounted on spindle 84 are already aligned in vertical planes with the loci of the two rows R1 and R2 of cigarette packages at station 36, being appropriately spaced apart by the width of the central web portion between them; hence they do not undergo any transverse movement, relative to each other or to the aforementioned plane of rotation, at any point during their advance from the coil 86 to the station 36.

With the web 78 threaded around pinwheel 88, and the pins 112 received in holes 82, forward feed of the web to the cutter 92 is effected by rotation of the pinwheel 88, which is driven intermittently (as hereinafter further explained), by the main motor of the apparatus, in correspondence with the advance of a cigarette carton towards station 36. A guide 114, partially surrounding the wheel 88, assures maintenance of the web in proper engagement with the wheel.

The slicer 90, which the web traverses beyond the pinwheel 88, comprises a set of rotary knives respectively disposed above and below the path of web advance, having paired knife edges disposed for rotation in vertical planes in position to cut, from the web, a longitudinal central strip portion midway between the imprint rows S1 and S2, the width of this cutaway strip being (as indicated in FIG. 4) equal to the distance $d_1$ between the two rows of applied stamps on the cigarette packages. Beyond the slicer 90, then, the web has the appearance indicated at 116 in FIG. 4, which shows the two rows of imprints separated longitudinally by the cutting away of the central portion at 118. Advantageously, the holes 82 have a diameter substantially equal to the width $d_1$ of the cutaway portion of the web so that, as the slicer 90 cuts this portion, it is separated into short lengths by successive holes 82, for ease of removal from the equipment. A web scrap conduit 120 may be mounted adjacent the slicer 90 on the head 20 (FIG. 3) for removal of these short scrap lengths by vacuum (suction) as they fall from the slicer.

The cutter 92, positioned beyond the slicer 90 and also mounted for rotation in a vertical plane, bears a straight knife edge 122 that extends transversely of the advancing web for cutting the rows of imprints S1 and S2 (which have already been separated longitudinally by the slicer) transversely into individual stamps as indicated at 123 in FIG. 4. The knife edge 122 acts against a support surface schematically shown at 124 in FIG. 3. Cutter 92 is driven intermittently in synchronism with the pinwheel 88 so that it intersects and cuts the separated rows S1 and S2 of the web between successive imprints as the web is fed forward by the pinwheel 88.

Each of the drums 94 and 96 (FIGS. 6 and 8) is a hollow member having a cylindrical periphery with two rows of apertures or suction openings formed in the periphery. Referring first to the drum 94 (FIGS. 6 and 8), the two rows of suction openings 126 formed in its periphery are spaced apart by a distance equal to the distance between the centers of imprints in the rows S1 and S2. These two rows of openings 126 are respectively disposed in the aforementioned vertical planes containing the imprint rows S1 and S2 in coil 86 as well as the loci of rows R1 and R2 at station 36. Each of the two rows of suction openings 196 on drum 94 extends around the periphery of the drum with successive openings spaced apart by distances equal to the distance between center points of successive stamps 10 as applied to cigarette packages in a row (R1 or R2) at station 36.

Figure 8:
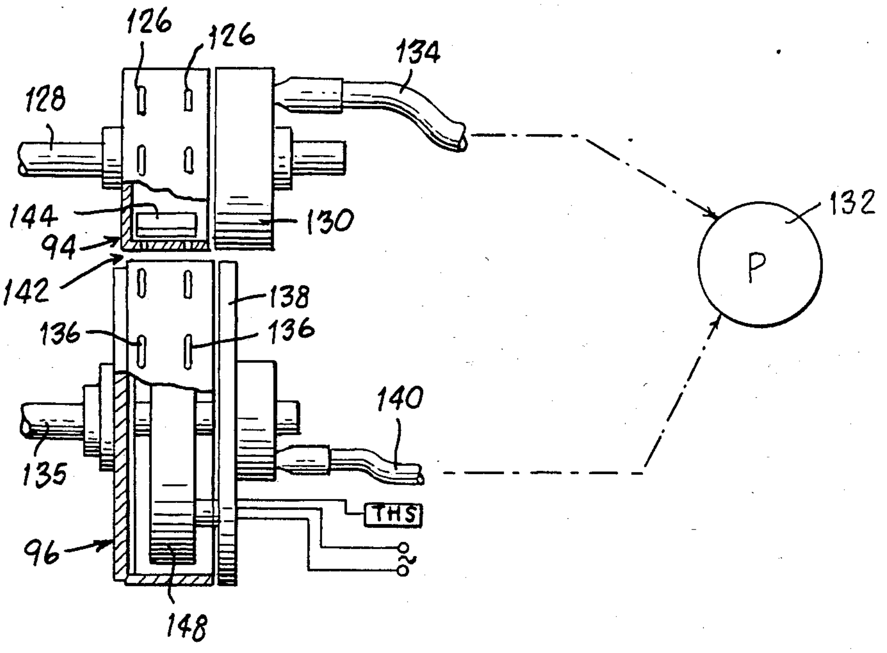
FIG. 8 is a view similar to FIG. 6 but reduced in scale and partially broken away, showing details of the label-transporting elements of the FIG. 1 apparatus.

As best seen in FIG. 8, the drum 94 is a hollow shell mounted for rotation on a shaft 128 and having an open forward side which is closed by a head 130. The drum 94 and head 130 cooperatively provide an enclosed, confined space within the drum, to which suction is applied from an airpump 132 through conduit 134 mounted in the head 130 so as to provide a suction or vacuum condition within the drum 94 that acts through the openings 126 to hold individual stamps 10 against the outer surface of the cylindrical periphery of the drum. From the foregoing description of the disposition of the openings 126, it will be apparent that when stamps 10 are thus held by suction, at the locations of the openings 126, they are properly spaced both transversely and longitudinally for application to the exposed end surfaces 14 of cigarette packages in a carton 12 at station 36.

The drum 96, though larger in diameter than drum 94, is of similar construction, comprising a forwardly open hollow shell rotatably mounted on shaft 135 with a cylindrical periphery bearing two rows of suction openings 136 respectively disposed in the same vertical planes as the two rows of openings 126 of the drum 94 and spaced apart in each row by distances corresponding to the above-described longitudinal spacing of successive openings 126 in the drum 94. The drum 96 is also enclosed by a stationary head 138 to provide a confined chamber within the drum to which suction is applied from pump 132 by line 140 (FIG. 8). As in the case of the drum 94, this suction serves to hold stamps 110 on the peripheral surface of the drum 96 at locations (determined by the positions of the suction openings 136) for register respectively with successive cigarette package ends 14 in the two rows R1 and R2 at station 36.

The two drums 94 and 96 are both driven continuously by the main motor of the apparatus, with drum 94 rotating clockwise and drum 96 counterclockwise, as seen in FIG. 3.

The drum 96 is disposed for tangential engagement of its cylindrical peripheral stamp-bearing surface with the exposed upwardly facing end surfaces 14 of the two rows of cigarette packages in a carton 12 at station 36, and its direction of rotation is such that its peripheral surface and the end surfaces 14 of the advancing cigarette packages are moving in the same direction at the point of such tangential engagement at station 36. The drum 94 is so disposed that stamps carried on its cylindrical periphery come into tangential engagement with the cylindrical periphery of drum 96 at a locality 142 above station 36. Further, the drum 94 is so positioned that as the two separated rows of imprints of the web 78 are cut transversely into individual stamps 10 by the cutter 92, those cut stamps are picked up and held by suction on the periphery of the drum 94. As will therefore be understood, the stamps, as cut by the cutter 92, are carried by the drum 94 from the cutting locality to the drum 96 at locality 142, being there transferred to the drum 96. For this purpose, means shown as stationary vacuum interrupter 144 may be disposed within the drum 94 adjacent the locality 142 for interrupting suction through the openings 126 at the locality 142, thereby to release the stamps for pickup by drum 96, i.e. by the suction applied to the openings 136.

Referring again to FIG. 3, the web 78 in the coil 86 is oriented with its printed surface facing outwardly, and the path of web advance from the coil is so arranged that as the cut stamps arrive at the transfer drum 94, they are picked up by that drum with their imprints facing outwardly and their adhesive surfaces against the drum periphery. Owing, however, to the fact that the adhesive of the stamps is heat activated, the stamps do not tend to stick to the periphery of the drum 94, because they are not exposed to heat until after they leave that drum.

It will further be appreciated from FIG. 3 that when the stamps are picked up by the applicator drum 96, their imprinted surfaces face toward the drum and their adhesive-bearing surfaces are exposed facing outwardly. A heater 148 is mounted within the drum 96, in position to raise the temperature of the stamps as they are carried on the drum periphery from locality 142 to station 36, and is operated at a temperature sufficient to activate the stamp adhesive so that the stamps will adhere to the cigarette packages at station 36.

As indicated e.g. in FIG. 3, a switch 3LS is positioned in the path of carton advance in the trough 26 ahead of the station 36, and is provided with a sensor 150 disposed to be pushed by an advancing carton, thereby to actuate the switch. This switch 3LS, in response to the sensed advance of a carton, initiates the intermittent drive of pinwheel 88 and cutter 92 to advance the two rows of imprints S1 and S2 by five imprints each, and thereby to deliver to the periphery of the transfer drum 94 ten cut stamps (i.e. two rows of five). The rate of cutting of the stamps by the cutter 92 is synchronized with the continuous rotation of the drum 94, so that successive stamps of each row arrive at the drum periphery as successive holes 126 pass the cutting locality. Thus, the requisite longitudinal spacing between successive imprints (for application to successive cigarette packages) is achieved by this cooperation of cutter 92 and drum 94; i.e., the longitudinal spacing between successive stamps, beyond the cutter, is determined by the longitudinal spacing between successive openings 126 on drum 94, and is typically greater than the spacing between successive imprints 80 on the uncut web 78. The transverse spacing between rows of stamps, as already explained, is determined by the initial spacing between rows of imprints on the web.

The drums 94 and 96 rotate synchronously and with the same peripheral velocity. On the periphery of the drum 96, the stamps (with their adhesive surfaces facing outwardly as heat is applied to actuate the adhesive) are arranged in positions for register respectively with successive cigarette package ends of the two rows of packages in an advancing carton 12 at station 36. The peripheral velocity of the drum 96 is the same as the constant linear velocity at which a carton 12 advances along trough 26. Thus, as the drum 96 carries the adhesive stamps 10 into contact with the cigarette package ends 14 at station 36, the package ends and the stamps are moving at the same speed and in the same direction and there is no relative motion between them. The stamps therefore adhere to the package ends at station 36, while the carton continues to move forward, and this adhesion of the stamps overcomes the suction of drum 96. As indicated in FIG. 3, the apparatus delivers exactly ten stamps (two rows of five each) to the station 36 for each advancing carton, the action of the web feed pinwheel 88 and cutter 92 being halted at these increments.

Figure 5:
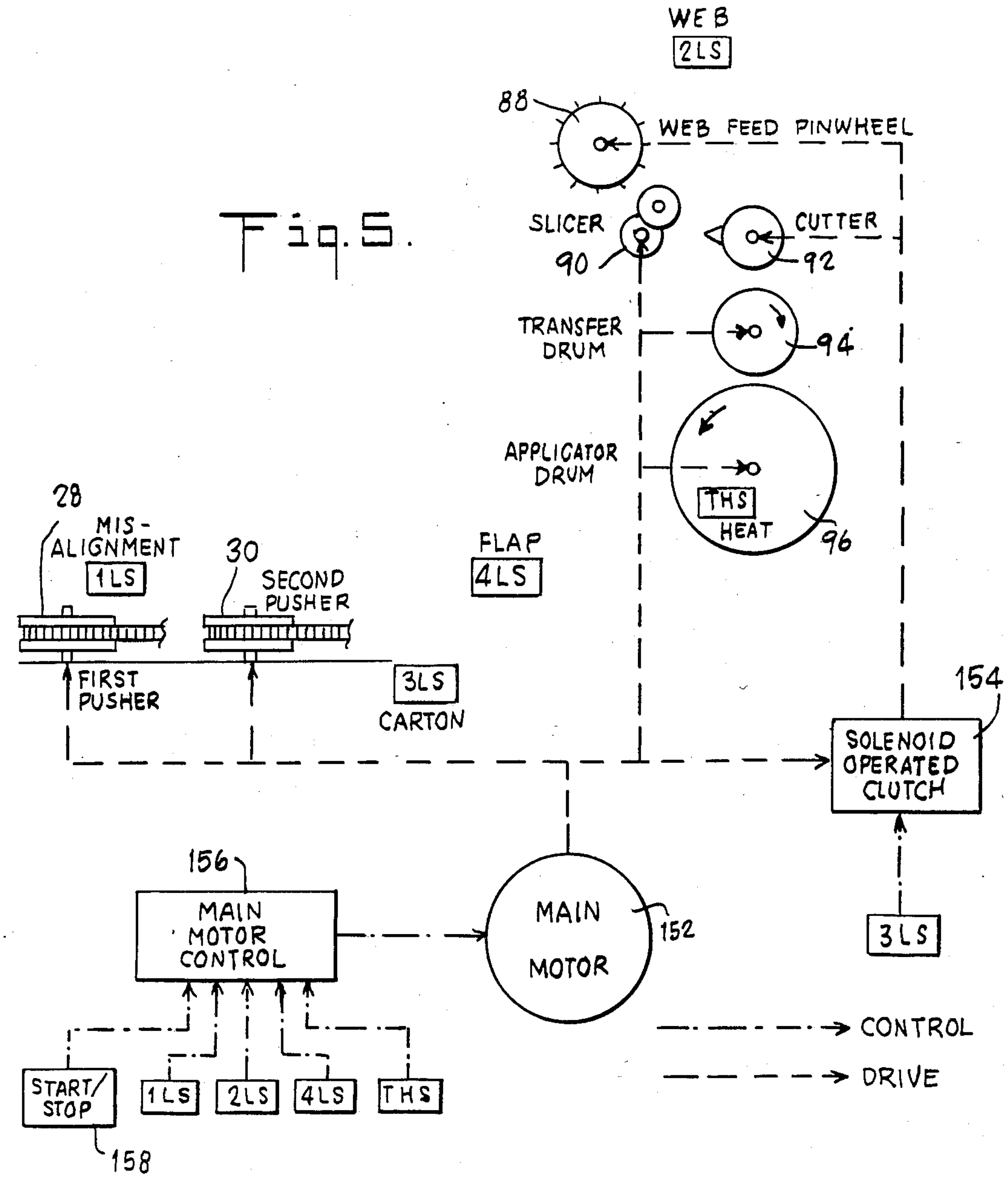
FIG. 5 is a diagrammatic view in illustration of the operation of the apparatus of FIG. 1.
Figure 6:
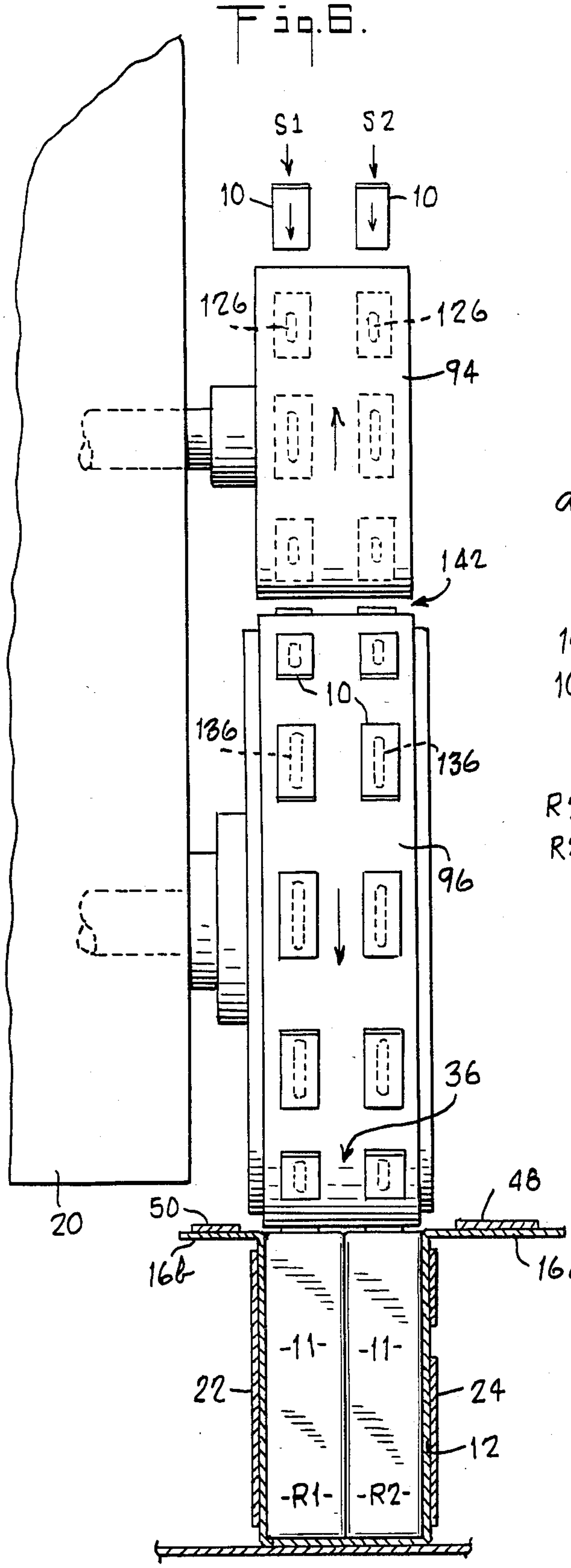
FIG. 6 is an enlarged fragmentary elevational view taken as along the line 6—6 of FIG. 3.

Drive and control features of the apparatus may be understood from the diagrammatic illustration of FIG. 5. As there shown, the apparatus includes a main motor 152, the output of which continuously synchronously drives the pushers 28 and 30, the drums 94 and 96, and the slicer 90. The motor 152 also supplies drive to a solenoid-operated clutch 154, which, when engaged, transmits drive to the web feed pinwheel 88 and the cutter 92. Engagement of this clutch is initiated by switch 3LS, i.e. when an advancing carton trips that switch as described above, and continues for a period just sufficient to feed forward five stamps in each of the rows S1 and S2.

A main motor control 156 is operable by a manual start/stop switch 158 to initiate or interrupt output from the main motor 152, and is also operated to interrupt main motor output drive under any of the following conditions:

(a) when switch 1LS is activated by misalignment of a lug 66 of the first pusher 28 relative to an incoming carton 12, as described above;

(b) when switch 2LS is actuated by absence of a web in the path of web advance, indicating exhaustion of the supply of stamps;

(c) when a switch 4LS (FIG. 3), disposed above the path of carton advance ahead of station 36, is tripped by an unopened or improperly positioned carton flap 16b, which might otherwise occlude the package end surfaces 14 and prevent proper application of stamps thereto; and (d) when a switch THS (FIG. 8) is actuated by failure of the heater 148 to achieve or maintain a predetermined temperature required for activation of the stamp adhesive. In each of these circumstances, interruption of the main motor output drive immediately halts the pushers, drums, and cutter, as well as the pinwheel 88 and cutter 92 (if clutch 154 is then engaged); upon correction of the drive-interrupting conditions, the motor 152 may be restarted, for resumed operation from the point of interruption, by manual depression of switch 158.

Figure 13:
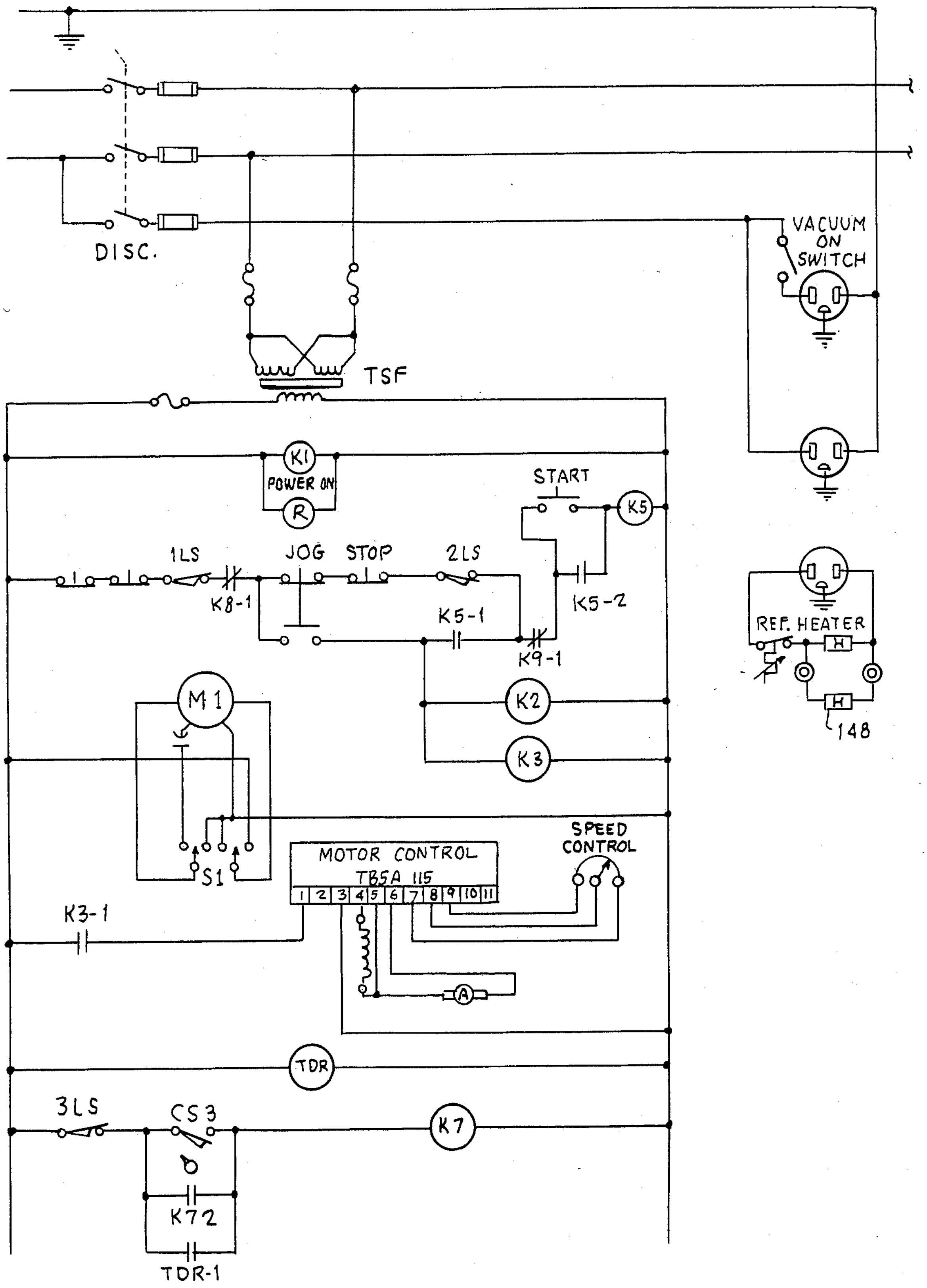

Further details of one arrangement of control circuitry for the apparatus are shown in FIGS. 13–15. The illustrated circuitry controls the operation of the main motor 152 which drives the first and second pushers 28 and 30, the vacuum transfer and applicator drums 94 and 96, the slicer 90, and (through the solenoid-operated clutch 154) the cutter 92 and web feed pinwheel 88; a motor for driving the infeed conveyor 32; a motor for driving the output conveyor 38; the heater 148 for the applicator drum; and the vacuum pumps for the transfer and applicator drums and web scrap conduit.

In this circuitry, a common 220 v. A.C. power supply under control of manually operable triple-pole switch DISC provides current for 110 v. A.C. outlets for the vacuum sources (under control of a manual "vacuum on" switch) and the heater; 220 v. A.C. bus lines 3L, 4L; and a transformer TSF having a 110 v. A.C. output. Various elements of the system are operated by limit switches (LS), and/or by control relays (K) having contacts which will be described as normally open if they are open when the relay is not energized, or normally closed if they are closed when the relay is not energized.

When the START button is pressed, i.e. with switch DISC closed, control relay K5 is energized through closed limit switch 1LS, normally closed contacts K8-1, the STOP switch, closed limit switch 2LS, and normally closed contacts K9-1, thereby closing normally open contacts K5-2 (so that K5 remains energized when the START button is released) and K5-1, energizing control relays K2 and K3. Energization of K3 closes normally open contacts K3-1 to start the output conveyor drive TB5A115. Energization of K2 closes normally open contacts K2-1 and K2-2, to start the main motor drive TB5230, while opening normally closed contacts K2-1', K2-2', and K2-3. This initiates continuous drive of the two pushers and the transfer and applicator drums, assuming (as further explained below) that all conditions (heater temperature, web flap position and carton alignment) are proper for operation.

Closure of switch DISC also energizes control relay K7 through closed limit switch 3LS and normally closed contacts TDR-1 of time delay relay TDR, which is simultaneously energized. Thereupon, normally open contacts K7-2 close, so that when contacts TDR-1 open at a predetermined interval following energization of TDR, K7 remains energized. The energization of K7 opens normally closed contacts K7-1 (which control energization of the clutch-engaging solenoid ISOL) and closes normally open contacts K7-1' (which control energization of the clutch-disengaging solenoid 2SOL); consequently, the clutch 154, which transmits drive from the main motor 152 to the cutter and web feed pinwheel, remains disengaged as long as K7 is energized.

Advance of a carton of cigarettes 12 along the laterally confined trough 26 of the apparatus (by means of the continuously driven pushers 28 and 30) toward the stamp-applying locality 36, however, trips switch 3LS open, de-energizing K7 so as to open contacts K7-1' and close contacts K7-1, with the result that the clutch 154 becomes engaged, driving the web-feed pinwheel 88 and the cutter 92. Thus, a set of stamps 10 for application to the cigarette packages of the carton is advanced to the transfer and applicator drums as the carton approaches the applicator drum 96. Cam switch CS3 closes, to enable K7 to be re-energized (disengaging the clutch 154) when 3LS is released for reclosure by passage of the trailing end 12*a* of the carton 12. This cycle is repeated upon advance of the next succeeding carton into switch-opening contact with 3LS.

If, however, an advancing carton becomes misaligned as it is delivered by the infeed conveyor to the first pusher 28, the misaligned carton opens 1LS (the misalignment switch of the first pusher), de-energizing K2 and K3. Contacts K2-1 and K2-2 thereupon open, halting the main motor 152 and the output conveyor motor so as to arrest the pushers, the transfer and applicator drums, and the output conveyor as well as preventing drive of the pinwheel and cutter. Upon realignment or removal of the carton, 1LS recloses, and manual depression of the START button restores drive to the main motor and output conveyor, enabling resumption of operation.

Similarly, if the stamp web 78 runs out, 2LS (the web detector switch) opens, de-energizing K2 and K3 with the same result of stopping the main motor and the output conveyor until a new web is spliced and positioned for feed, reclosing 2LS. If a mispositioned carton flap 16*b* trips and closes 4LS (the carton flap detector switch), after an advancing carton has opened 3LS and thereby de-energized K7 to close normally closed contacts K7-1, control relay K8 is energized to open normally closed contacts K8-1 and de-energize K2 and K3, again halting the main motor and the output conveyor. In this case, the stamps may have already been delivered to the transfer and/or applicator drums 94 and 96 but are held thereon by the vacuum while the drums themselves are arrested by the stopping of the main motor. Also, if the heater temperature is too low, thermal sensor switch THS-1 closes to energize control relay K9 and open normally closed contacts K9-1, once more disengaging K2 and K3 to halt the main motor and the output conveyor. Manual depression of the STOP button has the same effect. In each case, after the interrupting condition has been corrected, operation can be resumed by manually depressing the START button.

The head up-down motor M1, connected across the output of TSF, can be manually operated in either direction by appropriate positioning of double-pole-double-throw switch S1, whenever switch DISC is closed. The system also includes vacuum pumps ($\frac{1}{2}$ HP thermal overload) connected between 220 v. buslines 3L, 4L; a daily counter CTR 1 in parallel with a control relay K10 and actuated by each closure of contacts K7-1 (corresponding to application of stamps to one carton); and a total counter CTR 2 actuated by each closure of normally open contacts K10-1 upon energization of K10. In addition, the system has a reference heater and control connected in parallel with the applicator drum heater; a relay K1 with normally open contacts K1-1 and K1-2 for preventing current flow through bus lines 3L and 4L in the absence of an output from transformer TSF; and indicator lights for showing "power on" and "low heat" conditions.

The practice of the process of the invention with the above-described apparatus may now be readily explained. With a web coil 86 mounted on spindle 84, and with the web 78 threaded forwardly therefrom to slicer 90 along the path indicated in FIG. 3, and with a supply of glue provided in device 42, closed cartons of cigarette packages to be stamped are placed (in the above-described orientation, i.e. with package end surfaces 14 facing upwardly) on infeed conveyor 32 for sidewise advance thereon. The main and conveyor motors and the vacuum pumps are started. As the successive cartons are delivered by the infeed conveyor to the inlet end of trough 26, each carton is engaged in succession and advanced lengthwise by the pushers 28 and 30 along the trough 26 (from left to right as seen in FIG. 2) past the station 36 at a constant linear speed. The drums 94 and 96 are continuously rotating at a peripheral speed equal to the linear speed of carton advance. Each time a carton trips switch 3LS, the clutch 154 is engaged to transmit drive to the pinwheel 88 and cutter 92. The pinwheel advances the web 78 longitudinally (in a direction parallel to the rows of imprints S1 and S2) past the continuously driven slicer 90 to the cutter 92, by an increment equal to five successive imprints in each row, and then halts until the switch 3LS is tripped by the next advancing carton; the slicer removes a longitudinal strip portion of the web between the rows S1 and S2, and the cutter cuts the separated rows transversely into individual stamps which are picked up, as they are cut, by the suction openings 126 of the transfer drum 94.

The rotation of the transfer drum advances the two cut rows of five stamps each (again in a longitudinal direction with respect to the rows) to the locality 142, where the stamps are picked up by the suction openings 136 of the continuously rotating applicator drum 96, and carried by the rotation of that drum (with their adhesive-bearing surfaces exposed) to the locality or station 36, while the heater 148 within drum 96 activates the stamp adhesive.

Concurrently, the carton 12 which initiated delivery of the stamps, having been opened by plow 40 to expose the package end surfaces 14, is advancing to the station 36. The leading packages in the two rows R1 and R2 in the carton arrive at station 36 at the same time as the leading stamps 10 on drum 96. Since the ten stamps on drum 96 are in position for register, respectively, with the ten package end surfaces 14 of the carton, and since the surfaces 14 and the stamp-bearing drum periphery are moving at the same speed and in the same direction at station 36, the stamps are applied to the package ends as the carton and drum continue to move, the exposed and activated adhesive securing the stamps to the packages. It will be noted (see FIG. 6) that the path of advance of each row (S1 or S2) of stamps from the coil 86 all the way to the package ends 14 at station 36 lies in a single vertical plane which also contains the path of advance of the row of packages (R1 or R2) to which that row of stamps is to be applied.

Beyond the station 36, the carton flap **16*b* is glued and the flaps are reclosed (by means of arms 44, 46), after which the pusher 30** delivers the carton to the outlet conveyor.

In the event of malfunction, the system is halted by the appropriate switch (1LS, 2LS, 4LS, or THS) until the malfunction is corrected, and operation is then resumed. When the coil 86 is exhausted (and the operation is interrupted by switch 2LS), the leading end of a new coil can be spliced to the trailing end of the old web 78 at the splicing table 98 by taping the two ends together. Since the splicing occurs between successive imprints of the rows of imprints, while (in accordance with the invention described and claimed in the aforementioned United States patent application) the sprocket holes 82 are in register with the imprints, the splicing tape does not occlude any hole 82 and consequently does not interfere with the engagement of the web by pinwheel 88.

With this apparatus and procedure, stamps can be applied to the packages of a virtually continuous succession of cigarette cartons at a high rate of production (up to 120 cartons per minute, in an illustrative instance) yet in an error-free manner, i.e. without misapplication or loss of stamps. The structure and operation of the apparatus, and the correction of malfunctions, are advantageously simple. Cartons of different heights (cigarettes of different lengths) can readily be accommodated by appropriately adjusting the elevation of the head 20 relative to the table 18.

It is to be understood that the invention is not limited to the features and embodiments hereinabove specifically set forth but may be carried out in other ways without departure from its spirit.

We claim:

1. Apparatus for applying adhesive labels to upwardly facing surfaces of each of a multiplicity of articles arranged contiguously, with their upwardly facing surfaces substantially coplanar, in at least two parallel rows each including a plurality of the articles, using labels supplied as a continuous elongated web of flexible sheet material having a surface bearing an adhesive material and an opposite surface bearing at least two spaced-apart rows of label imprints, with the spacing between adjacent twos of imprints corresponding to a predetermined desired spacing between applied labels on adjacent rows of said articles, said apparatus comprising:

(a) means for defining a rectilinear path for concurrent lengthwise advance of said rows of articles;

(b) means for applying adhesive labels to the articles in said last-mentioned rows at a predetermined first locality in said path, said means including (i) a cyclically movable endless surface disposed and dimensioned for simultaneous tangential engagement with the upwardly facing surfaces of adjacent articles in all said rows of articles at a predetermined locality in said path as said rows of articles advance together in said path, said endless surface being mounted above said path for movement in the same direction as said rows of articles at said predetermined locality, and (ii) means for releasably holding individual labels on said endless surface at plural spaced rows of plural spaced sites positioned for register with the upwardly facing surfaces of the articles in said rows of articles as said surface moves and said articles advance in said path, the spacing between adjacent rows of said sites corresponding to the spacing between adjacent rows of said imprints;

(c) means for delivering separated labels to said endless surface, at a second locality spaced from said predetermined locality, in positions to be held on said endless surface at said spaced sites and transported by said endless surface to said predetermined locality for contact with and transfer to the upwardly facing surfaces of articles in said advancing rows of articles, said delivering means including (i) means for advancing the web longitudinally along a path leading toward the second locality, (ii) means, positioned in said last-mentioned path, for slicing out and removing from the advancing web a longitudinal strip portion between said two rows of imprints, and (iii) means, positioned in said last-mentioned path beyond the slicing means, for cutting the advanced web transversely to separate the rows of imprints into individual labels and delivering the individual labels to said sites at said second locality with the adhesive-material-bearing surfaces of the labels facing away from the endless surface; and (d) drive means for undirectionally advancing said articles in said first-mentioned path and said endless surface at the same speed, such that said endless surface and the upwardly facing surfaces of the articles in said rows of articles have the same surface velocity and direction of movement at said predetermined locality.

2. Apparatus as defined in claim 1, including means for adjusting the vertical positon of said endless surface and said delivering means vertically relative to said path-defining means, to enable application of labels to articles of different heights.

3. Apparatus as defined in claim 1, wherein said slicing means comprises (i) a rotary knife mounted in the path of web advance for rotation in a plane parallel thereto, said knife having paired blades for making two parallel slices in said web respectively along opposite sides of said strip portion, and (ii) suction means disposed adjacent said knife for receiving and removing said strip portion as it is sliced from said web.

4. Apparatus as defined in claim 1, wherein said applying means comprises a drum mounted above said first mentioned path for rotation in a plane containing said first mentioned path, wherein said endless surface is a cylindrical peripheral surface of said drum having suction openings at said sites, and wherein said holding means comprises means for applying suction through said openings to hold the labels against the peripheral surface at said sites.

5. Apparatus as defined in claim 4, wherein said last-mentioned plane contains said path of advance of the web such that the rows of imprints on the web advancing in the last-mentioned path are aligned with the rows of said sites on said peripheral surface.

6. Apparatus as defined in claim 1, wherein said last-mentioned means comprises a web-cutting element positioned at a third locality spaced from the second locality for cutting the web as aforesaid, and means for transferring the individual labels from said third locality into contact with the endless surface at said second locality such that the labels are received and held on said endless surface at said sites with their adhesive-bearing surfaces facing away from said endless surface for contact with the upwardly facing surfaces of articles in the advancing rows at the first locality.

7. Apparatus as defined in claim 6, wherein said applying means comprises a first drum mounted above said defined path of advance of the rows of articles for rotation in a plane containing said defined path; wherein said endless surface is a cylindrical peripheral surface of said first drum having suction openings at said sites; wherein said holding means comprises means for applying suction through said openings to hold the labels against the peripheral surface at said sites; wherein said transferring means comprises a second drum mounted for rotation in the last-mentioned plane and in tangential proximity to said peripheral surface of said first drum at said second locality, said second drum having a cylindrical periphery with plural rows of suction openings respectively aligned with rows of said sites; said transferring means further including means for applying suction through the last-mentioned suction openings to hold labels against said second drum periphery, said first and second drums both being rotated by said drive means with a common direction of peripheral motion at said second locality, and said second drum being disposed to pick up labels at said third locality by suction attraction to the second drum periphery as the labels are separated by said cutting element at said third locality.

8. Apparatus as defined in claim 7, wherein said last-mentioned plane contains said path of advance of the web such that the rows of imprints on the web advancing in the last-mentioned path are aligned with the rows of suction openings of the second drum periphery and with the rows of said sites on said first drum peripheral surface.

9. Apparatus as defined in claim 1, for use with a web having regularly spaced holes along its length, wherein the web-advancing means comprises a wheel, bearing a plurality of radial pins regularly spaced around its periphery for insertion in said web holes, rotatably mounted in the path of web advance.

10. Apparatus as defined in claim 1, wherein said first mentioned path-defining means comprises means for advancing the rows of articles in discrete groups along said first mentioned path, each said group containing a predetermined number of rows each including a predetermined number of articles.

11. Apparatus as defined in claim 10, further including control means, responsive to the advance of a group of articles past a predetermined point in said defined path ahead of said predetermined locality, for actuating said web-advancing means and said cutting means to deliver to said second locality a number of labels equal to said predetermined number of articles, in synchronism with the advance of the last-mentioned group of articles, such that the labels thus delivered are applied to the last-mentioned group of articles by the applying means as the last-mentioned group of articles advances past said predetermined locality.

12. Apparatus as defined in claim 11, including clutch means driven by said drive means for transmitting drive to said web-advancing means and said cutting means, and wherein said control means comprises means for successively engaging and disengaging said clutch means in response to the advance of a group of articles past said predetermined point.

13. Apparatus as defined in claim 12. for use in applying labels to groups of articles wherein each group is packaged in a carton, wherein said path-defining means includes (i) chain-and-sprocket means for advancing each carton lengthwise along said defined path, said chain-and-sprocket means including a chain having a run extending parallel to said defined path and bearing a lug for engaging and pushing the trailing end of a carton in said defined path, (ii) a conveyor for advancing said cartons sidewise into a position, in said defined path, for engagement by said lug, and (iii) means, responsive to lateral displacement of said lug by engagement with a side wall of a misaligned carton at said last-mentioned position, for stopping said drive means.

14. Apparatus as defined in claim 12, further including means, having a sensor positioned to detect the presence of a web in the path of web advance, for stopping said drive means when no web is present in the last-mentioned path.

15. Apparatus as defined in claim 12, for use with labels wherein said adhesive material is heat-activated, further including means associated with said endless surface for heating labels during transport on said endless surface to activate the adhesive material.

16. Apparatus as defined in claim 15, further including temperature-sensitive means for stopping said drive means when the temperature of said heating means is below a predetermined value.

17. Apparatus as defined in claim 12, for use in applying labels to groups of articles wherein each group is packaged in a carton initially having closed top flaps, further including means positioned in said defined path ahead of said predetermined locality for opening said top flaps, and sensor means positioned in said defined path intermediate said opening means and said predetermined locality for stopping said drive means in response to the sensed presence of an unopened or improperly opened top flap.

18. Apparatus for applying adhesive labels to end surfaces of each of a group of identically shaped and dimensioned articles of rectangular solid configuration arranged contiguously, with said end surfaces facing upwardly and coplanar, in a predetermined plurality of parallel horizontal rows each including a predetermined plurality of the articles aligned with the articles in each adjacent row, using labels supplied as a unitary elongated web of flexible sheet material having one surface bearing an adhesive material and an opposite surface bearing a multiplicity of label imprints arranged in said predetermined plurality of rows, the imprints in adjacent rows being aligned with each other, the rows of imprints extending lengthwise of the web and being spaced apart transversely of the web, the spacing between adjacent rows of imprints on the web being equal to a predetermined desired spacing between applied labels on adjacent rows of the articles in a group, said apparatus comprising:

(a) means for continuously advancing a group of the articles, as a unit, lengthwise of the rows therein along a defined rectilinear path past a predetermined locality, (b) means disposed at a locality above said defined path for cutting the web transversely between successive label imprints in the rows of imprints;

(c) means for advancing the web lengthwise to said cutting means;

(d) means, positioned to engage the advancing web ahead of the cutting means, for slicing out and removing a longitudinal strip portion of the web between each two adjacent rows of imprints, thereby separating the rows of imprints such that the subsequent transverse cutting of the web by the cutting means completes the separation of the imprint-bearing portions of the web into individual labels, said web-advancing means maintaining the rows of imprints spaced apart at their original distance from each other as and after they are separated by said slicing means so that the separated labels cut from adjacent rows of imprints by the cutting means have the same transverse spacing; and (e) means for receiving the labels as they are separated by the cutting means and transporting them into contact with the upwardly facing ends of the articles of a group at said predetermined locality, in such manner that the labels and the articles are moving in the same direction and at the same speed as they come into contact at said predetermined locality, while maintaining their alignment and transverse spacing and while spacing successive labels cut from each row of imprints for register respectively with successive articles in each row of a group.

19. Apparatus as defined in claim 18, including means for intermittently actuating the web-advancing means and the web-cutting means, in response to advance of each group of the articles along said defined path toward said predetermined locality, to deliver to said receiving and transporting means a plurality of separated labels equal in number to the articles of a group.

20. Apparatus as defined in claim 20, for use with a web as aforesaid having an array of holes disposed at regular intervals along its length between adjacent rows of said imprints, said holes being disposed to be substantially coincident with said strip portion and dimensioned to be substantially equal in diameter to the width of said strip portion such that as said strip portion is sliced out it is separated by successive ones of said holes into short lengths, wherein said web-advancing means comprises a driven wheel, bearing a plurality of radial pins regularly spaced around its periphery for insertion in said web holes, rotatably mounted in the path of web advance.

21. Apparatus as defined in claim 20, wherein said receiving and transporting means includes a moving endless surface on which the labels are transported, with their adhesive-bearing surfaces facing outwardly, into contact with the upwardly-facing ends of said articles at said predetermined locality; wherein said adhesive material is a heat-activated adhesive; and including means for heating the labels as they are being transported on said endless surface as aforesaid to activate the adhesive material on the labels.

22. Apparatus as defined in claim 21, wherein said receiving and transporting means comprises (i) a first drum mounted for rotation above, and in a plane containing, said defined path, and having a cylindrical periphery constituting said endless surface, said cylindrical periphery being disposed for tangential engagement with the upwardly facing ends of articles advancing in a group as aforesaid at said predetermined locality and having an array of spaced suction openings respectively disposed, in said predetermined plurality of rows, for register with the upwardly facing ends of the last-mentioned articles, (ii) a second drum mounted for rotation in said last-mentioned plane with a cylindrical periphery disposed in tangential proximity to the first drum periphery and to said cutting means for receiving separated labels cut by the cutting means, said second drum periphery having an array of spaced suction openings disposed in said predetermined plurality of rows, and (iii) means for applying suction through the suction openings of the first and second drum peripheries to hold labels thereon such that as labels are separated by said cutting means they are picked up by said first drum periphery and then transferred therefrom to said second drum periphery for transport to said predetermined locality.

23. Apparatus as defined in claim 22, for applying labels to the ends of articles arranged in groups and consisting of two rows of the articles, wherein said predetermined plurality of rows is two.

24. Apparatus as defined in claim 22, including means for driving said group-advancing means and said first and second drums synchronously such that said first and second drums have opposite senses of rotation; engageable and disengageable clutch means for transmitting drive from said driving means to said web-advancing means and said cutting means; and clutch control means, positioned in said defined path ahead of said predetermined locality, for engaging said clutch to transmit drive as aforesaid, in response to advance of a group of articles along said defined path toward said predetermined locality, for a limited period such that the web-advancing means and cutting means deliver to the second drum periphery a number of separated labels equal to the number of articles in a group.

25. Apparatus as defined in claim 24, further including means for stopping said drive means in response to the sensed existence of any one or more of the following conditions:

(i) misalignment of a group of articles, relative to the group-advancing means, (ii) absence of a web in the path of web advance ahead of the slicing means, (iii) presence of an obstacle carried with an advancing group of articles in a position to obstruct application of labels to the upwardly facing ends of the articles, and (iv) failure of said heating means to attain or maintain a predetermined temperature.

26. Apparatus as defined in claim 25, further including means for raising and lowering the web-advancing means, the slicing means, the cutting means, and the first and second drums as a unit relative to said defined path to enable application of labels to articles of different heights.

27. Procedure for applying adhesive labels to multiple identically shaped and dimensioned articles of rectangular-solid configuration, comprising (a) continuously advancing the articles, arranged contiguously with coplanar upwardly facing surfaces in a predetermined plurality of parallel horizontal rows each including a plurality of the articles aligned with the articles in each adjacent row, in a direction lengthwise of the rows along a defined rectilinear path, past a first locality in said path;

(b) at a second locality, spaced from said path, providing a multiplicity of adhesive labels arranged, in said predetermined plurality of parallel spaced rows each including plural longitudinally spaced labels, for register respectively with the upwardly facing surfaces of the articles advancing in said defined path as aforesaid, the label-providing step comprising (i) advancing, lengthwise, an elongated web of flexible sheet material constituting a supply of the labels and having one surface bearing an adhesive material and an opposite surface bearing a multiplicity of label imprints arranged in said predetermined plurality of rows, the imprints in adjacent rows being aligned with each other, the rows of imprints extending lengthwise of the web and being spaced apart transversely of the web, the spacing between adjacent rows of imprints on the web being equal to a predetermined desired spacing between applied labels on adajcent rows of the articles advancing past said first locality, (ii) slicing out and removing, from the advancing web, a longitudinal strip portion of the web between each two adjacent rows of imprints, thereby separating the rows of imprints, (iii) while advancing the separated rows of imprints with maintained spacing between adjacent rows, cutting the web transversely between successive label imprints in the separated rows of imprints, thereby completing the separation of the imprint-bearing portions of the web into individual labels, and (iv) receiving and holding the separated labels as they are cut, on a moving endless surface while maintaining the alignment and transverse spacing between labels cut from adjacent rows of imprints, in such manner as to space successive labels cut from each row of imprints for register, respectively, with the upwardly facing surfaces of successive articles advancing past said first locality, said endless surface moving through said second locality, thereby to provide a multiplicity of labels arranged for transport; and (c) transporting the labels, in a direction lengthwise of the rows of labels, from said second locality to said first locality and into contact with said upwardly facing surfaces of said articles at said first locality, while maintaining the rows of labels and the labels in each row spaced as aforesaid, in such manner that the labels and the articles are moving in the same direction and at the same velocity when they come into contact as aforesaid at the first locality.

28. Procedure according to claim 27, wherein the advancing step comprises advancing the articles in discrete groups each consisting of a predetermined number of articles, and wherein the providing step comprises intermittently advancing, slicing, and cutting the web to provide a predetermined plurality of separated labels, equal to said predetermined number of articles, in correspondence with the advance of each said group in said defined path toward said first locality.

29. Procedure according to claim 28, wherein the advancing step comprises advancing the articles in discrete groups each consisting of two parallel rows of the articles, and wherein the web has two rows of imprints.

30. Procedure accordingto claim 27, wherein said moving endless surface is the cylindrical periphery of a drum and has a multiplicity of suction openings arranged in said predetermined plurality of rows extending around said periphery and transversely spaced in correspondence with the spacing between adjacent rows of imprints on the web, the openings of adjacent rows being aligned with each other and the spacing between successive openings in each row corresponding to a predetermined desired spacing between applied labels on successive articles in each row of articles advancing past said predetermined locality; and wherein the receiving and holding step comprises rotating the drum, while applying suction through the openings, in such position and sense that the rows of openings are respectively aligned with the rows of imprints on the advancing web, the drum periphery is disposed for contact with the labels as they are separated by the cutting step, and the direction of movement of the drum periphery is the same as the direction of web advance at the point at which the cutting step is performed, the rates of web advance and drum rotation being synchronized such that successive labels cut from a row of imprints are respectively received and held at successive openings of the row of openings aligned therewith.

31. Procedure according to claim 30, wherein said drum delivers the labels to said second locality for transfer to a cylindrical peripheral surface of another drum disposed for rotation in a plane containing said defined path and for tangential contact with the upwardly facing surfaces of articles advancing as aforesaid in said defined path at said first locality, said peripheral surface having suction openings, and the transporting step comprising rotating the last-mentioned drum while transferring the labels thereto at the second locality and while holding the labels on said cylindrical peripheral surface by suction, the labels being oriented such that their adhesive-bearing surfaces face away from said cylindrical peripheral surface for contact with and adhesion to the upwardly-facing surfaces of the articles at said first locality.

32. Procedure according to claim 30, wherein said adhesive material is a heat-activatable adhesive, and wherein the transporting step further includes heating the labels for activation of the adhesive while the labels are being transported from said second locality to said first locality.

* * * * *